Dec. 4, 1951

J. MERCIER

Re. 23,437

OLEOPNEUMATIC DEVICE

Original Filed May 15, 1940

Jean Mercier
INVENTOR
By Otto Munk
his ATT'Y.

Reissued Dec. 4, 1951

Re. 23,437

UNITED STATES PATENT OFFICE 23,437

OLEOPNEUMATIC DEVICE

Jean Mercier, New York, N. Y.

Original No. 2,256,835, dated September 23, 1941, Serial No. 335,385, May 15, 1940. Application for reissue August 23, 1950, Serial No. 180,950. In France June 16, 1939

1 Claim. (Cl. 267—64)

Matter enclosed in heavy brackets [ ] appears in the original patent but forms no part of this reissue specification; matter printed in italics indicates the additions made by reissue.

The present invention relates to oleo-pneumatic devices including a rigid envelope or case containing two fluids, at pressures which are equal or different, separated from each other by a deformable partition [constituted by] *constituting* a flexible bag or the like disposed on the inside of said rigid envelope or casing and secured thereto.

Devices of this kind are already known and they are applied, in particular, to the case of pressure accumulators, oleo-pneumatic shock absorbers, or the like.

In devices of this kind, a flexible bag, filled with a gas under pressure, such as compressed air, inflates as soon as the pressure existing in the portion of the rigid envelope exterior to said bag decreases.

It has been found that these devices have certain drawbacks, which become apparent when the apparatus is in operation and which reduce the efficiency and life thereof. Furthermore, after a relatively short time, these devices are no longer safe to operate in view of the quick deterioration of this flexible bag.

These drawbacks are due in particular to the fact that the wall of the bag expands to a greater degree in the portions of said wall which are remote from the point of fixation of the bag to the rigid container than in the zones thereof which are close to this point of fixation.

As a consequence, the zone of the bag which is close to the point of fixation thereof to the rigid container is subjected to tension stresses which are relatively high and may bring about a rapid wear and tear.

On the other hand, the portions of the bag wall which are remote from the point of fixation thereof may become applied against the wall of the rigid container before the portions of the bag which are nearer to said point of fixation come into contact with said wall. Thus, pockets filled with oil are formed between the wall of the flexible bag and the wall of the container, and they prevent a complete expansion of the bag containing the gas under pressure. Consequently, it is possible to utilize only a portion of the oil, or analogous fluid, present in the vessel on the outside of the bag (in the case of the apparatus that is being considered constituting an oleo-pneumatic accumulator).

The chief object of the present invention is to provide a device of the type above described which is better adapted to meet the requirements of practice than the devices used for the same purpose up to the present time, and in particular a device which obviates the drawbacks above mentioned.

For this purpose, according to [an essential feature of] the [present] invention *from its broader aspects, the size, shape and elastic characteristics of the* flexible bag *is so correlated with the size and shape of the inner surface of the rigid container that the distance of the partly inflated bag from the inner surface of the container increases progressively from near the fixed end of the bag toward the opposite end thereof, so that in the further inflation of the bag it will progressively engage such inner surface of the container from near such fixed end of the bag toward the opposite end thereof.* [is of such shape and structure that it has a conical form either before it is inflated (thus remaining conical after it has been inflated) or only after it is inflated. In a more general way, according to the invention, the flexible bag is made of such shape and/or structure that, once inflated, the section thereof decreases gradually from the zone adjoining the point of fixation of the bag to its rigid container toward the end of the bag which is at the opposite of said point of fixation.]

[It will be readily understood that, with such an arrangement, the wall of the flexible bag in the course of being inflated is gradually applied against the inner surface of the rigid container or envelope in such manner that the first portions to be applied against said rigid wall are the portions adjoining the point of fixation of the bag to the container, while the portions more remote from this point of fixation come into contact with the wall of the rigid container only when the bag is very strongly inflated.]

[Thus, owing] *Owing* to this arrangement, the tensional stresses acting on the flexible wall of the bag close to the point of fixation thereof to the rigid container are transmitted to the rigid wall of the container and [, on the other hand,] no oil pocket can be formed between the bag and the wall of the [receiver] *container*, since said bag is gradually applied against the rigid wall from the end thereof adjoining the point of fixation toward the other end.

It follows that the whole of the fluid present between the wall of the bag and [that] *the inner surface* of the rigid container is driven off toward the outside, that is to say toward the end of the rigid container opposed to that at which the bag is fixed thereto, said first mentioned end being provided with an outlet orifice.

Other features of the present invention will result from the following detailed description of some specific embodiments thereof.

A preferred embodiment of the present invention will be hereinafter described, with reference to the accompanying drawing, given merely by way of example, and in which:

Fig. 1 diagrammatically shows, in elevation and longitudinal section, an oleo-pneumatic accumulator including a rigid envelope or container, and a flexible bag fixed to said container at one of its ends, such an accumulator being made in the usual known manner so as to illustrate the drawbacks of this construction;

Figure 4:
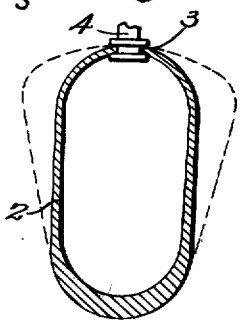

Fig. 4 diagrammatically shows, in elevation and longitudinal section, a second embodiment of the invention.

Figure 5:
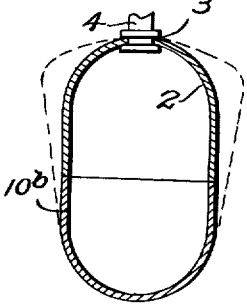

Fig. 5 is a similar view of a third embodiment of the invention.

Figure 1:
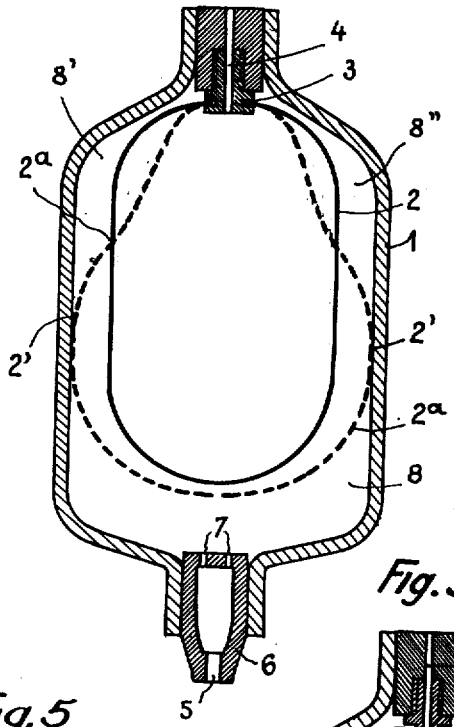

In the arrangement disclosed by Fig. 1, an oleo-pneumatic accumulator is constituted by a rigid container 1 on the inside of which is provided an expansible and flexible bag 2. Preferably, this bag is made of an elastic material such as rubber, either synthetic or not, which is not attacked by oil or any other fluid as may be employed. This material may for instance consist of a polymerization product of vinyl alcohol, styrol, neoprene, etc. I might make use of any other plastic material stable when in contact with the two fluids considered.

Bag 2 may be merely fixed to the outer rigid container at 3. Preferably, the inlet 4 for gas under pressure such as compressed air is at 3. The flow of this incoming gas is controlled by means of a cock, valve, or any other suitable organ, not shown on the drawing.

At the end of rigid container 1 opposed to this inlet conduit 4 through which air is fed into bag 2, there is provided an outlet conduit 5 for the other fluid, such as oil [contained in envelope 1 outside of bag 2,] *in the container*, this outlet conduit 5 leading to the parts in which this second fluid under pressure is to be utilized. This conduit 5 may be fitted with a check valve (not shown) and be in communication with orifices 7 provided in a piece 6, as shown in Fig. 1. However, orifices 7 might be provided directly in the wall of container 1. Conduit 5 may also serve to [the] feed [of compartment 8] *container 1* with the fluid under pressure to be accumulated therein.

In Fig. 1, I have shown in solid lines the shape of bag 2 when the fluid in [chamber 8] *container 1* is under high pressure and the volume of said [chamber] *container* is accordingly very great. This corresponds to an accumulation of oil under pressure in this [chamber] *container*.

In the apparatus shown by Fig. 1, the bag is supposed to be of uniform diameter over its whole length, or at least most of said length. If oil is fed out through orifices 7, the bag inflates so as to occupy the portion of the volume of [chamber 8] *container 1* which corresponds to the amount of oil discharged through conduit 5. The bag will then come to assume the shape shown in dotted lines at $2^a$ in Fig. 1. In this state, the partly inflated bag 2 is applied against the inner wall of envelope 1 along a median zone 2', so that the oil imprisoned in the pockets 8', 8'' thus formed above said zone is cut off from the outlet 7—5 and can no longer be utilized. On the other hand, most of the tensional stress undergone by the wall of bag 2, when it is being inflated, is applied to this bag at 3 where it is fixed to container 1 and subjects the adjoining portion of this flexible wall to [exaggerate] *exaggerated* stresses, which greatly limit the life of said bag.

[In order to avoid this drawback, according to the present invention, the bag is made of special shape and/or structure, ensuring a better distribution of the stresses over the surface of the flexible wall and also a practically total discharge of the oil or other fluid under pressure accumulated in the rigid container 1.]

Figure 2:
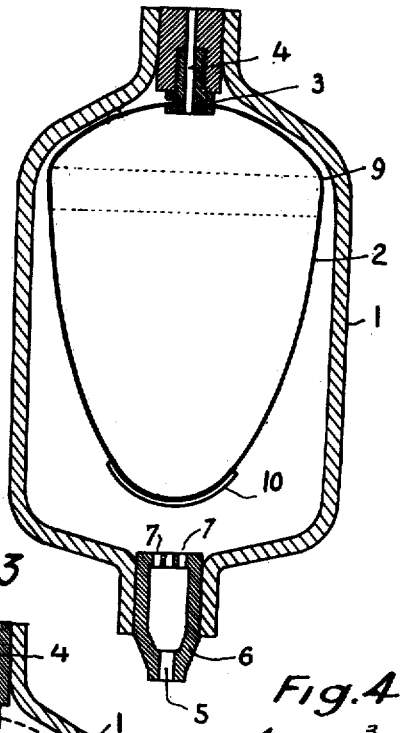
Fig. 2 is a similar view of an oleo-pneumatic accumulator of the same kind but made according to the invention.
Figure 3:
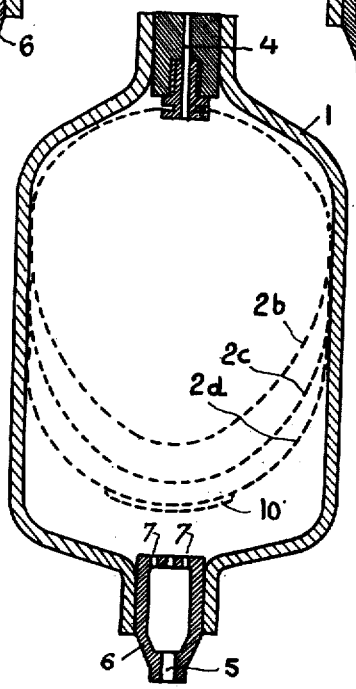
Fig. 3 is a view similar to Fig. 2 showing in dotted lines different states of the bag as it is more or less inflated.

An embodiment of an oleo-pneumatic device made according to the present invention, is shown by Figs. 2 and 3 [.] *in which the bag is made of special shape and/or structure, ensuring a better distribution of the stresses over the surface of the flexible wall and also a practically total discharge of the oil or other fluid under pressure accumulated in the rigid container 1.*

These figures show an oleo-pneumatic accumulator analogous to that shown by Fig. 1, and the same reference characters designate the same elements as in said Fig. 1. According to [the essential feature] *this embodiment* of the invention, bag 2 has, in longitudinal section, a wedge-like shape, i. e. said bag is substantially conical, or, in a more general manner, the diameter cr section of the bag decreases from a zone 9 adjoining the point of fixation 3 gradually toward the free end 10 of the bag. This conical shape of bag 2 is especially visible in Fig. 2, which shows the bag in a relatively deflated state.

At its free end 10, bag 2 is preferably reinforced, in such manner as to be able to act as a valve closing the outlet of container 1, by being applied on orifices 7 and closing them when bag 2 has been caused to inflate to its maximum volume.

Owing to its conical shape, bag 2 is applied against the inner [wall] *surface* of the rigid container 1 *which is preferably cylindrical, as shown*, first in the zone adjoining the point of fixation 3, and the area of contact increases gradually as the bag becomes more and more inflated. This is shown by Fig. 3, in which the various positions $2^b$, $2^c$, $2^d$ successively occupied by bag 2, when its volume increases as a consequence of the outflow of oil from [chamber 8] *container 1*, are shown in dotted lines.

It must be noted that the embodiment illustrated by Figs. 2 and 3 and above described is not the only possible one within the scope of the present invention.

In particular, in the state of rest, the bag might be of another shape, for instance cylindrical, but in this case, in order to ensure the same result as above, that is to say in order to obtain a bag of substantially conical shape when it is being inflated, or immediately before this, it is [necessary] *preferred* to make this bag of a material, or a combination of materials, such that its resistance to elastic deformations increases gradually from the point of fixation to the rigid container to the free end of said bag.

In order to obtain this result [.] *with a bag of uniform composition*, I may vary [.] *the thickness of the bag as is shown in Fig. 4 wherein the thickness of the bag 2 increases as it approaches the tip 10a*, [along the length of the bag, the properties of a given material, for instance by varying its composition, its thickness as is shown in Fig. 4 wherein the thickness of the bag 2 increases as it approaches the tip 10*a*. Or] *or* I may vary *along the length of the bag* the nature of the various materials which enter into the composition of the bag as shown in Fig. 5 wherein 10*b* designates a material different from 2.

[Anyway, the] *As has been shown, the* essential *feature of* [characteristic of the bag, according to] the invention [,] *is so to correlate the bag in its expansion characteristics, determined by its shape or size or its composition or two or more of said factors, with the shape or size of the inner surface of the rigid container, that in the inflation of the bag it will progressively engage such inner surface of the container from near the fixed end of the bag toward the opposite end thereof.* [to wit its conical or substantially conical shape is to be considered only when said bag is in service. It] *Although to accomplish this end the bag and the container could be of any suitable shape, in the various embodiments herein shown to illustrate the invention, the container is preferably cylindrical and the bag has an expansion characteristic progressively decreasing from one end, which is secured to the wall of the container, to its opposite end. A bag having such progressively decreasing expansion characteristics will assume conical or substantially conical shape, when slightly inflated, and it* little matters whether said bag is conical or not in the non-inflated state if, when inflated it becomes conical, which result can be obtained in different ways as above set forth.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the scope of the present invention as set forth by the appended claims.

What I claim is:

[1. A device of the type described which comprises, in combination, a rigid container for two different fluids, and a deformable partition for separating said two fluids from each other constituted by a flexible deformable bag placed on the inside of said container and filled with one of said fluids, which is compressible, said bag being secured at one end to the inside of said container and being so made that, at least in the partly inflated state, its section goes decreasing from one zone thereof adjoining said fixation toward the opposite end thereof.]

[2. A device of the type described which comprises, in combination, a rigid container for two different fluids, and a deformable partition for separating said two fluids from each other constituted by a flexible deformable bag placed inside said container and filled with one of said fluids, which is compressible, said bag being secured at one end to the wall of said container and being so made that, at least in the partly inflated state, the portion thereof extending from a point close to the above mentioned end to the other end thereof is of roughly conical shape.]

[3. A device of the type described which comprises, in combination, a rigid container for two different fluids, a deformable partition for separating said two fluids from each other constituted by a flexible deformable bag placed inside said container and filled with one of said fluids, which is compressible, and means for fixing one end of said bag to the wall of said container, said means being provided with an inlet passage for the feed of said compressible fluid to said bag, said bag being so made that, at least in the partly inflated state thereof, its section goes decreasing from one zone thereof adjoining said fixation means toward the opposite end thereof.]

[4. A device of the type described, which comprises, in combination, a rigid container for two different fluids, a deformable partition for separating said two fluids from each other constituted by a flexible deformable bag placed inside said container and filled with one of said fluids, which is compressible, and means for fixing one end of said bag to the wall of said container, said means being provided with an inlet passage for the feed of said compressible fluid to said bag, said bag being so made that, at least in the partly inflated state thereof, the portion thereof extending from a region close to said fixation means to the other end thereof is of roughly conical shape.]

[5. A device of the type described which comprises, in combination, a rigid container for two different fluids, and a deformable partition for separating said two fluids from each other, constituted by a flexible deformable bag placed inside said container and filled with one of said fluids, which is compressible, said bag being secured at one end to the wall of said container and being of such shape, in the deflated state that its section goes decreasing from the portion thereof adjoining said fixation toward the opposite end thereof.]

[6. A device of the type described which comprises, in combination, a rigid container for two different fluids, and a deformable partition for separating said two fluids from each other constituted by a flexible deformable bag placed inside said container and filled with one of said fluids, which is compressible, said bag being secured at one end to the wall of said rigid container and being, in the deflated state, of conical shape from the part thereof adjoining said fixation to the other end thereof.]

[7. A device of the type described which comprises, in combination, a rigid container for two different fluids and a deformable partition for separating said two fluids from each other constituted by a flexible deformable bag placed inside said container and filled with one of said fluids, which is compressible, said bag being fixed at one end to the wall of said rigid container and having a wall of varying resistance from the attached end to the free end whereby its outer surface contacts the inner wall of the container progressively from that end at which the bag is secured toward the opposite end of said container.]

[8. A device of the type described which comprises, in combination, a rigid container for two different fluids and intended to act as pressure accumulator, a deformable partition for separating said two fluids from each other constituted by a flexible deformable bag placed inside said container and filled with one of said fluids, which is compressible, means for fixing one end of said bag to the wall of said container, said means being provided with a passage for said compressible fluid, and an inlet and outlet conduit connected to said rigid container at the end thereof opposed to said fixation means, said bag being so made that, at least in the partly inflated state thereof, its section goes decreasing from the part thereof adjoining said fixation means toward the opposite end thereof.]

[9. A device of the type described, which comprises, in combination, a rigid container for two different fluids, intended to work as pressure accumulator, a deformable partition for separating said two fluids from each other constituted by a flexible deformable bag placed inside said container and filled with one of said fluids, which is compressible, means for fixing one end of said bag to the wall of said container, said means being provided with a passage for said compressible fluid, an inlet and outlet conduit connected to said rigid container at the end thereof opposed to said fixation means, said bag being so made that, at least in the partly inflated state thereof, its section goes decreasing from the part thereof adjoining said fixation means toward the opposite end thereof, and a reinforcement carried by said last mentioned end of said bag adapted to cooperate with the opening of said conduit for stopping it when said bag is fully inflated.]

[10. A device according to claim 9 in which said bag is of roughly conical shape in the deflated state.]

[11. A device according to claim 9 in which the resistance to deformation of the wall of said bag goes increasing toward the last mentioned end thereof, which is intended to cooperate with the opening of said conduit.]

[12. A device of the type described which comprises, in combination, a rigid container for two different bodies of fluid, and a deformable partition for separating said bodies of fluid, said partition comprising a flexible deformable bag mounted inside the container and containing one of said bodies of fluid, said bag being secured at one end to the inside of said container and being of such shape and construction that as it inflates its outer surface contacts the inner wall of the container progressively from that end at which the bag is secured to the container toward the opposite end of said container.]

*13. A pressure accumulator comprising a rigid, substantially cylindrical container having a pair of axially aligned ports at the respective ends thereof, lying on the axis of said cylinder, a deformable, resilient, substantially conical bag in said container in communication with one of said ports and fixed in said container so as to extend axially thereof, said bag having a greater cross section near the fixed end thereof than at its free end and when in substantially non-distended condition, having its side wall adjacent the fixed end thereof closely adjacent the wall of said container and its side wall near the free end thereof spaced from the wall of said container by a distance substantially greater than that between the side wall of the bag adjacent its fixed end and the adjacent wall of said container, the distance between the side wall of the bag and the wall of the container from near the fixed end of the bag to near its free end being progressively increasing, whereby upon collapse of said bag and subsequent expansion thereof during the operation of the accumulator the free end of said bag will not rub against the wall of said container.*

JEAN MERCIER.

No references cited.

Certificate of Correction

Reissue No. 23,437 December 4, 1951

JEAN MERCIER

It is hereby certified that error appears in the printed specification of the above numbered patent requiring correction as follows:

Column 8, line 33, strike out "No references cited." and insert instead the following:

REFERENCES CITED

The following references are of record in the file of this patent or the original patent:

UNITED STATES PATENTS

| Number | Name | Date |
|---|---|---|
| 2,165,465 | Ehrhardt et al. | July 11, 1939 |

FOREIGN PATENTS

| Number | Country | Date |
|---|---|---|
| 352,361 | France | May 27, 1905 |
| 842,835 | France | Mar. 13, 1939 |

and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*